Jan. 19, 1960 R. H. KUHL 2,921,400
WEEDLESS FISH LURES
Filed Nov. 27, 1957

INVENTOR.
Richard H. Kuhl
BY
Morsell & Morsell
ATTORNEYS.

United States Patent Office 2,921,400
Patented Jan. 19, 1960

2,921,400

WEEDLESS FISH LURES

Richard H. Kuhl, Menomonee Falls, Wis.

Application November 27, 1957, Serial No. 699,317

1 Claim. (Cl. 43—42.43)

The present invention relates to improvements in weedless fish lures, and more particularly to a fish lure which has means for protecting the hooks from weeds passing both above and beneath the lure.

Many types of fish hook guards have been designed in the past with a view toward preventing weeds and other objects from catching in the hooks as a lure is drawn through the water. These so-called weedless lures utilize a variety of spring guards which prevent weeds from becoming caught on the points of the hooks. It is not infrequent, however, that weeds passing around the lure also become entangled with the shanks and rounded ends of the hooks, thereby causing the line to become snagged or interfering with its action, and its has been found that the conventional weed guards are ineffectual against this hazard. A general object of the present invention, therefore is to provide an improved fish lure having means by which the entire hook assemblage is protected against entanglement with weeds.

Another object of the invention is to provide in a fishing lure a unique combination of guards which will effectively deflect weeds and other objects from the hooks, which guards in no way interfere with action of the lure or cause loss of fish when a strike takes place.

A more specific object of the present invention is to provide a fish lure of the spoon type having a pair of divergent hooks fixed rigidly thereto, spring wire weed guards adapted to engage the hook points to prevent said points from catching in weeds or the like, and a bifurcated tail section, comprising two wings, each of which protects one hook from weeds and other obstacles from below.

A more specific object of the invention is to provide a fish lure in which the free ends of the spring wire weed guards are shaped and bent to permit them to automatically disengage from the hook points when a fish strikes at the lure, thereby preventing the interference of said guards with the impaling action of the hooks.

Another specific object is to provide a lure in which the inner ends of the spring wire weed guards may be wound spirally around the hook shanks and inserted through offset holes in the shank ends, which novel anchoring arrangement causes the wires to tend to spring inwardly and upwardly when a strike takes place, to a position where they will not interfere.

A further specific object of the invention is to provide a fish lure having a pair of rigid divergent hooks and a bifurcated tail section which is adapted to effectively prevent the entanglement of the hooks with weeds as the lure passes over weedbeds, and which bifurcated tail arrangement allows a fish to be caught on one hook only when striking the lure at an angle from the rear, and which makes it unnecessary for the fish to get the entire rear of the lure into its mouth in order to get caught.

Other objects of the present invention are to provide a fishing lure of the spoon type, which can be used for either casting or trolling, which is simple in design and construction, which is strong and durable, and which is shaped in a novel manner to provide an enticing back and forth movement in the water when being reeled in or trolled.

Further objects and advantages of the invention will become apparent from a study of the following specification and accompanying drawing wherein like characters designate corresponding parts in all of the views, and wherein.

Figure 1:
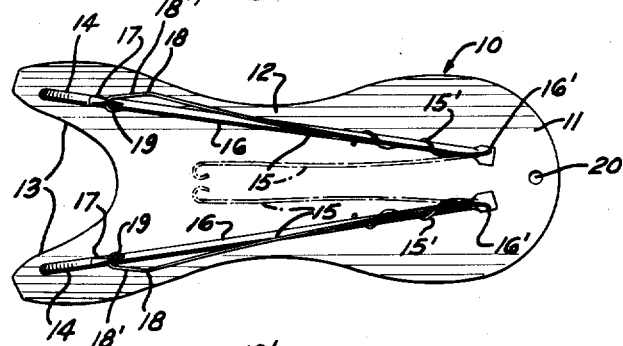
Fig. 1 is a top plan view of the improved weedless fish lure, showing the spring wire arms in guarding position on the hook points and, in broken lines, showing the spring arms in their disengaged position.

Referring now more particularly to the drawing, the improved weedless fish lure comprises a spoon-type body 10, formed of thin sheet metal or other suitable material, cut to provide a rounded front portion 11, a narrowed intermediate portion 12, and a bifurcated rear portion having spaced tail projections 13. A pair of divergent hooks, of a conventional shape and design, have their shanks 16 secured rigidly to the body 10 of the lure and extend rearwardly at an angle whereby the curved ends 14 and points 17 of the hooks are positioned within and above the peripheral margins of the spaced tail projections 13, there being one hook within each tail projection.

Figure 2:
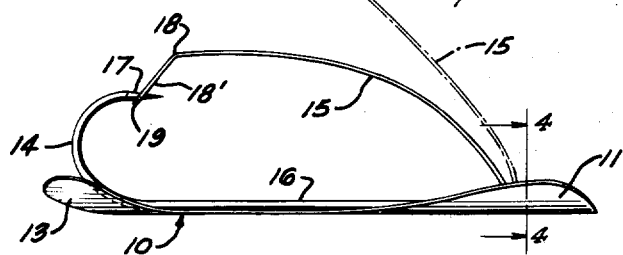
Fig. 2 is a side elevation of the lure shown in Fig. 1.

A spring wire arm 15 has its inner end wound spirally around the end portion of each of said hook shanks 16 as at 15' and inserted through an outwardly offset hole 16' in the shank end, whereby the portion of each extended spring arm 15 which comes out of a hole is urged inwardly when released from a hook to assume the unobstructing position shown in broken lines in Figs. 1 and 2. The spring arms 15 form an acute angle with the hook shanks 16 and extend a distance equal to or greater than the distance between the shank ends and the hook points 17. A bend 18 directs each spring arm 15 obliquely downwardly as at 18' toward the hook points 17. The free ends 19 of the spring arms are U-shaped to permit their releasable engagement with the hook points 17 when the spring arms are pressurably flexed to engaging position. When retained by said hook points 17, the arms are held under spring tension.

In practice, when it is desired to cast or troll the lure, the spring arms 15 are manually forced outwardly and downwardly into a position where they are engaged and retained by the hook points 17. As the lure is drawn through the water in the position of Fig. 2, the arms deflect any weeds or other obstacles which would otherwise be inclined to catch on said hook points 17. When a fish strikes at the lure, however, its mouth pushes one or both of the spring wire arms inwardly and out of engagement with the hook points, whereupon the spring arms spring to the central unobstructing positions shown in broken lines in Figs. 1 and 2, and the hooks, or either of them, are free to perform their intended function.

Figure 3:
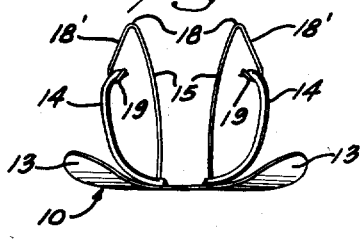
Fig. 3 is a rear view of the lure.
Figure 4:
Fig. 4 is a sectional view taken on line 4—4 of Fig. 2, illustrating the transverse section of the front portion of the lure.

The body 10 of the lure is of the spoon type and is slightly arcuate transversely to its longitudinal axis, the degree of curve being greatest in the rounded front portion 11, as is shown in Fig. 4. The forward end of the body is provided with an intermediate hole 20 for the reception of a fishing line or leader. As will be noticed in Figs. 2 and 3, the bifurcated tail projections 13 are bent upwardly and are arcuate both transversely and longitudinally to the body of the lure, in addition to diverging laterally rearwardly at an angle similar to the angle between the hook shanks 16. The unusual contour and arrangement of the tail projections is an important element of the present invention, as it provides the means by which the rounded ends 14 of the hooks are protected from entangling weeds and other obstacles which are below the lure.

As illustrated in Figs. 1, 2 and 3, the tail projecttions 13 provide protection for the curved ends of the hooks. When the lure is reeled through the water it comes in on its back with the hooks projecting upwardly, said tail projections 13 forming a shield against weeds beneath the lure. It has been found that such partial covering provides an effective guard for the entire curved hook end, inasmuch as the water currents created by the curved surfaces of said tail projections tend to carry the weeds out of proximity with the hooks, thereby eliminating the need for a more extensive shield. Being bent upwardly to partially cover the rounded end of a hook, as described, the novel tail projections 13 also form an effective camouflage means for the hooks, in addition to guarding the same from weeds and to improving the action of the bait.

Of considerable importance in the present invention is the fish-like appearance given the lure by the bifurcated tail projections, said tail projections closely resembling the tail structure of a real fish. Moreover, the bent and curved nature of the tail projections and the curvature shown in Fig. 4 causes the lure to dart to and fro as it is drawn through the water, an action which further contributes to the appearance of naturalness.

An extremely valuable additional feature of the bifurcated tail projections is the fact that their spaced divergent relationship allows a fish to become hooked with only one of the tail sections in its mouth. If, for example, a fish attacks the lure from behind at a 45° angle, the probability of its taking the entire rear portion of the lure in its mouth is remote, especially if it is a so-called short strike, or one in which the fish does not attempt to devour the entire lure. The divergent hook and tail arrangement utilized in the present invention, however, is designed so that at least one of the spaced tail projections and hooks will very probably enter the mouth of the fish even in the case of a short strike.

It will be seen that the improved weedless fish lue comprising the present invention is protected from weeds passing both above and beneath the hooks by virtue of the combination of spring arm guards and bifurcated tail projections employed therein. The many other advantages of a fish lure constructed in accordance with the present invention will be readily appreciated, and although the preferred embodiment of the invention is illustrated and described, it is to be understood that changes in details of construction may be resorted to which will fall within the scope of the invention as claimed.

What I claim is:

A weedless fish lure of the spoon type comprising a body plate having a forward portion with a rounded front outline, an intermediate portion of less width than said forward portion, and a bifurcated rear portion having a pair of rigid spaced divergent projections, said forward portion being curved transversely with respect to the longitudinal axis of said body and said rear projections being upwardly turned and curved transversely of said body; a pair of fish hooks longitudinally fixed on said body, each of said hooks including a shank having a hole which is offset laterally with respect to the longitudinal center line of said shank, said shanks extending rearwardly and laterally outwardly on said body, the rounded end of each hook being disposed within the outline of one of said upwardly-turned rear projections with the pointed end of each hook spaced above its projection and intermediate the width thereof, said projections projecting rearwardly at least as far as the rearmost extremity of the hooks thereon and being adapted to protect the rounded end portions of said hooks from weeds over which the lure is passing; and a spring wire arm anchored to the inner end of each hook shank and resiliently extending rearwardly therefrom at an acute vertical angle, each of said wires having an inner end extending through said offset hole in a shank and wound spirally around the shank end, said wire arms having their free ends U-shaped to permit their releasable engagement with said pointed ends of the hooks to protect the same from weeds or other obstacles, there being a plate portion below all parts of each arm.

References Cited in the file of this patent

UNITED STATES PATENTS

| | | |
|---|---|---|
| 1,258,213 | Grothkopf | Mar. 5, 1918 |
| 1,754,073 | Yates | Apr. 8, 1930 |
| 2,184,330 | Arbogast | Dec. 26, 1939 |
| 2,509,179 | Warnock | May 23, 1950 |
| 2,705,848 | Stettner | Apr. 12, 1955 |